Oct. 21, 1930.                F. G. MILLER                1,779,071
                      CONDENSATION PREVENTING DEVICE
                          Filed March 6, 1926
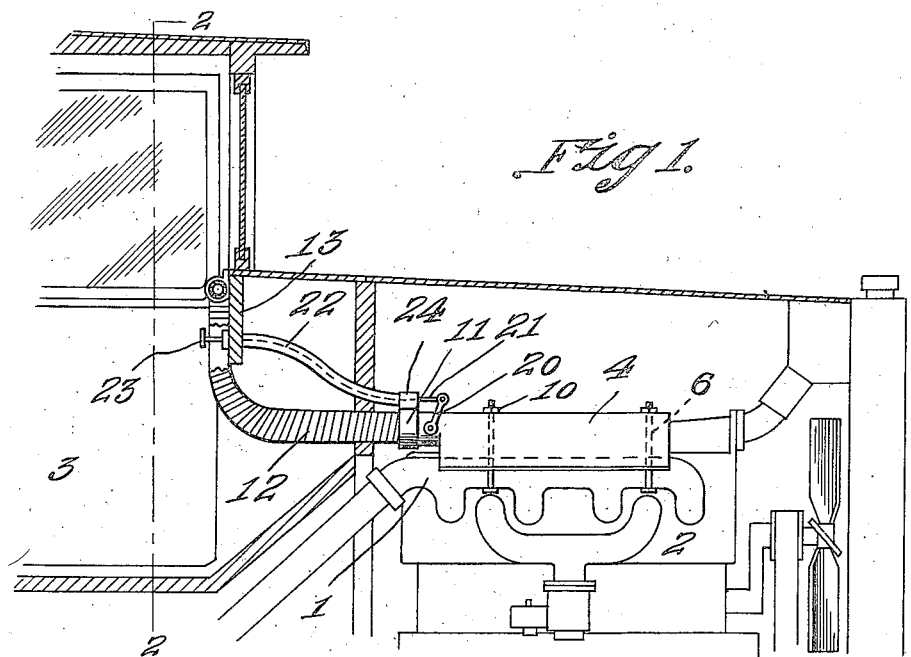
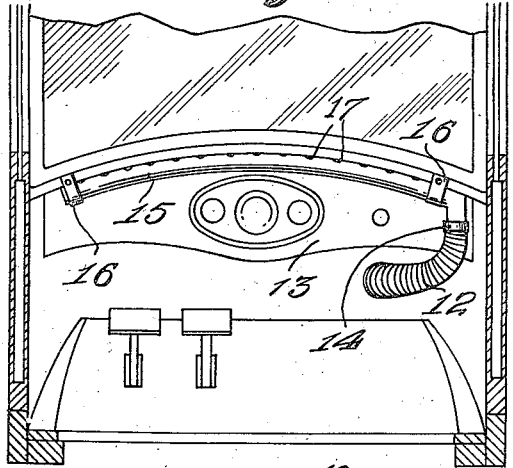
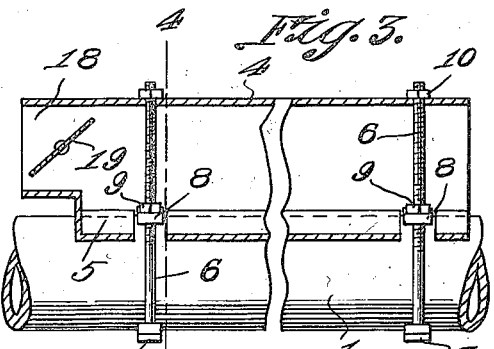
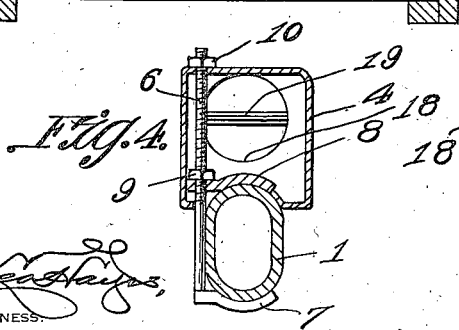
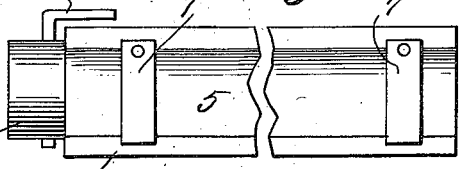
Frank G. Miller,
INVENTOR
BY Victor J. Evans
ATTORNEY Patented Oct. 21, 1930

1,779,071

UNITED STATES PATENT OFFICE

FRANK G. MILLER, OF MOUNT STERLING, OHIO

CONDENSATION-PREVENTING DEVICE

Application filed March 6, 1926. Serial No. 92,821.

The object is the provision of a heating device for automobiles or like motor propelled vehicles, in which a stove is arranged over the exhaust manifold of the engine to receive heated air therefrom and which has at its outer end a flexible pipe connected to an apertured pipe arranged directly below the windshield of the automobile, there being a valve controlling the heat passage from the stove to the apertured radiator pipe and whereby only the interior of the car will be heated, but condensation will be prevented from forming on the glass of the windshield so that the driver will have a perfect vision of road conditions ahead when driving in stormy weather.

To the attainment of the foregoing, the invention consists in the improvement as hereinafter described and definitely claimed.

In the drawings:

Figure 1 is a side elevation of the improvement in applied position, a portion of the automobile and the hood of the engine being in section.

Figure 2 is a sectional view approximately on the line 2—2 of Figure 1.

Figure 3 is a central longitudinal sectional view through the stove part of the improvement.

Figure 4 is a sectional view on the line 4—4 of Figure 3.

Figure 5 is a top plan view of the stove.

Referring now to the drawings in detail, the numeral 1 designates the exhaust manifold of an internal combustion engine 2 which is employed for driving an automobile 3. On the top of the exhaust manifold 1 I arrange the stove part 4 of my improvement. The stove is in the nature of a tubular member but which has its bottom portion widened and dished inwardly, as at 5. This widened portion, at determined intervals is notched and there is passed through the top of the stove and through the said notches bolts 6. Each of the bolts has on its outer end a curved finger 7 for clamping engagement with the under face of the intake manifold there being a second finger 8 on each of said bolts for engaging with the top of the intake manifold. This last mentioned finger is slidable on the bolt and is held in engagement with the manifold 1 through the medium of a nut 9 which is screwed on the bolt. Each of the bolts is engaged by a second and outer nut 10, the last mentioned nuts connecting with the top of the stove.

The inner end of the stove is reduced, but is rounded in cross section and there is clamped on this reduced end, by means 11, a flexible hot air conducting pipe 12 which passes through an opening in the dash of the machine and is directed toward the instrument board 13 thereof. The end of the flexible conductor pipe or tube 12 is connected by means 14 to an arched pipe 15 that is secured by clamps 16 to the instrument board directly above the lower windshield frame. The pipe 15 is provided with spaced apertures 17 and this pipe is really in the nature of a radiator.

In the reduced portion 18 of the stove there is a valve or damper 19, the same having an outer angle arm 20 to which is connected a flexible pull rod 21 that leads through a guide tube 22 through the dash and through the instrument board of the automobile. The pull rod has a headed end 23 and is guided through an eye portion 24 on the bracket 11.

The simplicity of my construction and the advantages thereof will, it is thought, be perfectly apparent to those skilled in the art to which the invention relates, when the foregoing description has been carefully read in connection with the accompanying drawings. Of course, the device is employed only for winter driving and the same may be readily removed from the engine and from the body of the automobile when not required for use, although the device may remain a permanent fixture as the closing of the damper valve 19 will prevent the passage of hot air to the radiator pipe 15 in warm weather. The air inlet to the stove is opened, and the valve or damper 19 is regulated so that a free passage of air through the stove will be permitted, thus allowing a sufficient quantity of air to at all times remain in the stove to be thoroughly heated before being conducted to the radiator. The heated air not only prevents the condensation of moisture on the windshield but also serves to impart warmth to the interior of the car 3.

Having described the invention, I claim:—

A clamp for securing a heater to the exhaust manifold of an engine comprising a threaded rod extending through the heater and below the manifold, a clamping finger formed on the lower end of the rod and curved to fit under the manifold, a second finger slidable on the rod and curved to engage over the manifold, a nut threaded on the rod within the heater and bearing against the second finger to cause said fingers to tightly grip the manifold, and a nut threaded to the rod and bearing against the outer face of the heater to force the latter tightly against the manifold.

In testimony whereof I affix my signature.

FRANK G. MILLER.